US005487326A

United States Patent [19]

Owens

[11] Patent Number: 5,487,326

[45] Date of Patent: Jan. 30, 1996

[54] HYDRAULIC CYLINDER WITH END CLOSURE ASSEMBLY

[76] Inventor: Carl H. Owens, 4466 McGirts Blvd., Jacksonville, Fla. 32210

[21] Appl. No.: 917,784

[22] Filed: Jul. 20, 1992

Related U.S. Application Data

[63] Continuation of Ser. No. 646,192, Jan. 28, 1991, abandoned.

[51] Int. Cl.[6] .............................. F01B 29/00; F16J 15/18

[52] U.S. Cl. .............................. 92/128; 92/165 R

[58] Field of Search .............................. 92/128, 165 R, 92/168, 169.1, 171.1; 384/7, 16, 15, 41; 277/47, 181, 182, 187, 188 R, 189

[56] References Cited

U.S. PATENT DOCUMENTS

| | | | |
|---|---|---|---|
| 2,569,028 | 9/1951 | Stryker | 92/168 X |
| 2,639,198 | 5/1953 | Kirkham | 277/188 R X |
| 2,737,404 | 3/1956 | Lapsey | 384/16 |
| 2,849,263 | 8/1958 | Johnston | 92/168 X |
| 3,777,627 | 12/1973 | Goade | 92/171.1 X |
| 3,847,404 | 11/1974 | Agostino, Jr. | 277/187 |
| 3,937,201 | 2/1976 | Howe | 92/171.1 X |
| 4,085,661 | 4/1978 | Schriever | 92/168 X |
| 4,363,261 | 12/1982 | Mehta | 92/168 X |
| 4,781,024 | 11/1988 | Nakamura | 92/168 X |
| 4,936,197 | 6/1990 | Brent | 92/168 |
| 4,977,760 | 12/1990 | Ishimori et al. | 92/169.1 X |

FOREIGN PATENT DOCUMENTS

| | | | |
|---|---|---|---|
| 81707 | 6/1983 | European Pat. Off. | 92/168 |
| 255858 | 2/1988 | European Pat. Off. | 92/171.1 |
| 929649 | 1/1948 | France | 92/168 |
| 3045477 | 7/1982 | Germany | 92/168 |

*Primary Examiner*—John E. Ryznic
*Attorney, Agent, or Firm*—Arthur G. Yeager

[57] ABSTRACT

A hydraulic cylinder having a gland nut that is welded to the cylinder barrel and a split ring spring retainer removably inserted into the gland retainer to hold the rod gland in place.

11 Claims, 2 Drawing Sheets

HYDRAULIC CYLINDER WITH END CLOSURE ASSEMBLY

This is a continuation of application Ser. No. 07/646,192 filed on Jan. 28, 1991, now abandoned.

BACKGROUND OF THE INVENTION

Hydraulic cylinders are used in many applications where a strong linear reciprocating force is needed to move a piece of equipment. As is well known, the hydraulic cylinder includes a cylinder barrel inside of which a piston and a piston rod move lengthwise of the cylinder as oil pressure is applied or removed from the faces of the piston. One end of the cylinder barrel is closed by a rod gland through which the rod moves linearly. In the prior art the rod gland is held in place with a gland nut which is fastened to the barrel by screw threads. This arrangement has been used successfully for many years, but it has inherent weaknesses due to the screw thread connection and the manner in which the rod gland is held in place.

It is an object of this invention to provide an improved hydraulic cylinder design. It is another object of this invention to provide an improved design of hydraulic cylinder in which screw thread connection of the barrel and gland nut is eliminated. Other objects will become apparent in the detailed description which follows.

BRIEF SUMMARY OF THE INVENTION

This invention relates to a hydraulic cylinder having a cylinder barrel, a piston, a piston rod, a rod gland, the improvement which comprises a rod gland retainer assembly including a gland retainer which is welded to the cylinder barrel in the absence of any screw thread connection between the rod gland retainer and said cylinder barrel, the gland retainer having an internal circumferential ledge, and the assembly further including a split ring spring retainer removably inserted between the ledge and bearing against the rod gland to hold it in place.

In specific and preferred embodiments of this invention the lower end of the cylinder barrel is tapered to facilitate assembly of the rod gland and an O-ring seal therebetween and the circumferential groove is tapered to facilitate the insertion and removal of the split ring spring retainer.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The features of this invention are best understood by reference to the attached drawing.

Figure 1:
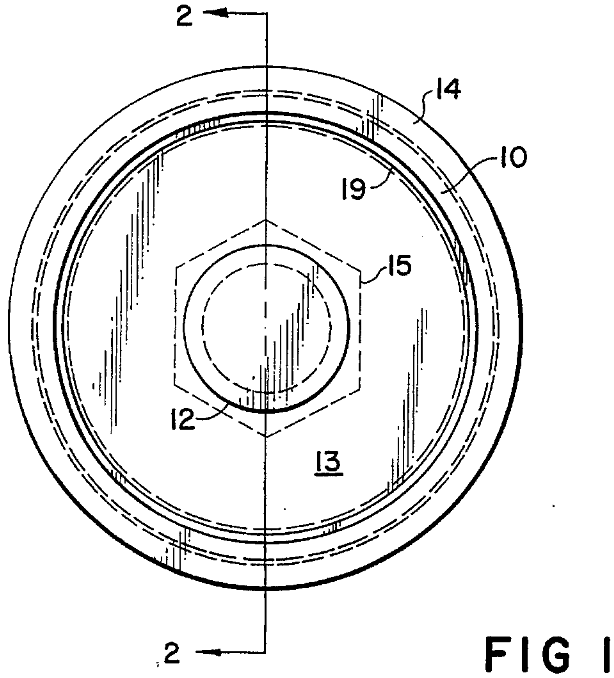
FIG. 1 is a bottom plan view of the hydraulic cylinder of this invention.
Figure 2:
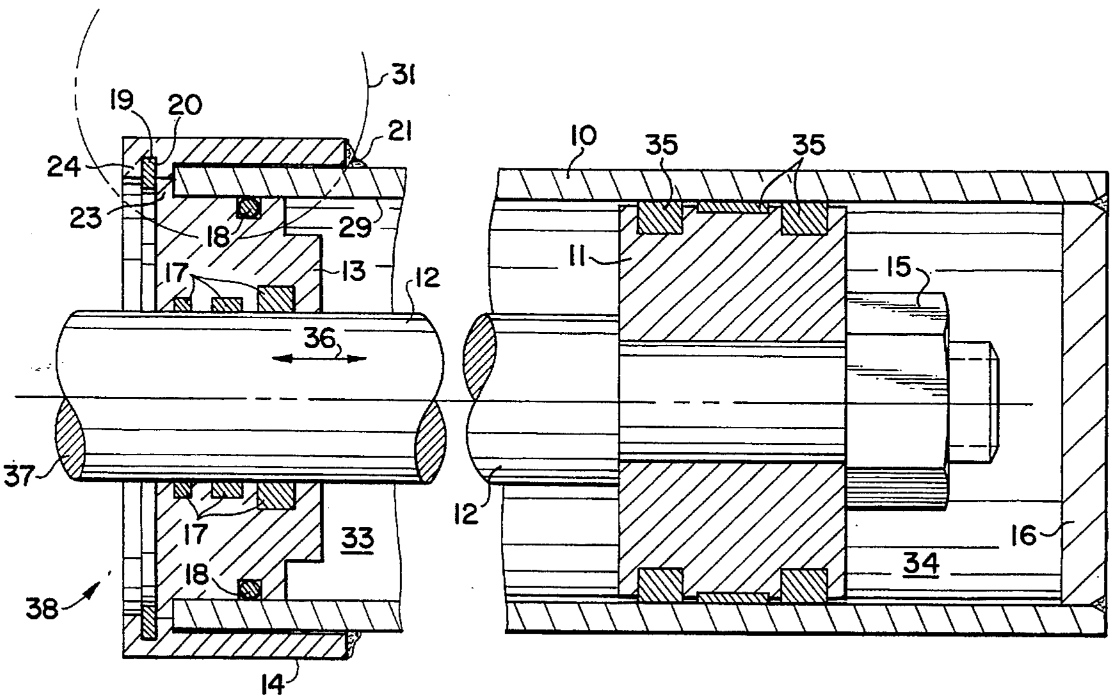
FIG. 2 is a cross-sectional view taken at 2—2 of FIG. 1.

As best seen in FIGS. 1–2, the hydraulic cylinder of this invention includes a cylinder barrel 10, a piston 11, a piston rod 12, a rod gland 13, a gland retainer assembly 14, a piston rod nut 15 and a cylinder barrel head 16. Linear reciprocating force is produced by introducing hydraulic fluid under pressure into space 33 or space 34 to cause piston 11 to move and thereby to cause piston rod 12 to move in the direction of arrow 36. Piston 11 is sealed by piston rings 35 against leakage of hydraulic fluid from space 33 to space 34. Rod gland 13 is affixed to cylinder barrel 10 and allows piston rod 12 to slide in the direction of arrow 36 along longitudinal axis 32, which is the axis of barrel 10, rod 12, and all of the components of the hydraulic cylinder. Internal packing 17, and O-ring seal 18 prevent pressurized hydraulic fluid from leaking past rod gland 13 to the atmosphere outside of the hydraulic cylinder. Rod 12 at end 37, which extends out of cylinder barrel 10, is fitted with any convenient type of connector so as to transmit the lineal force of rod 12 to any desired tool, such as an earth moving blade, a lifting platform, or the like.

Figure 3:
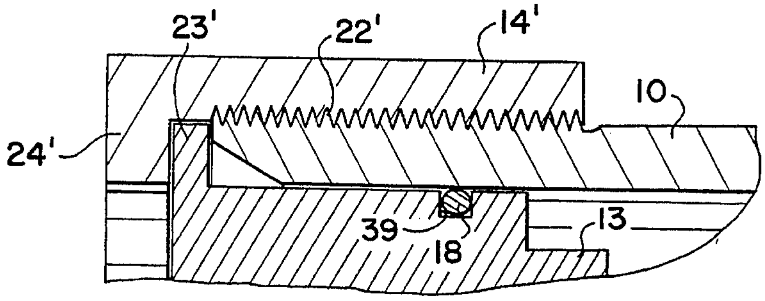
FIG 3 PRIOR ART
FIG. 3 is an enlarged cross-sectional view of the cylinder barrel, rod gland, and gland nut as known in the prior art.
Figure 4:
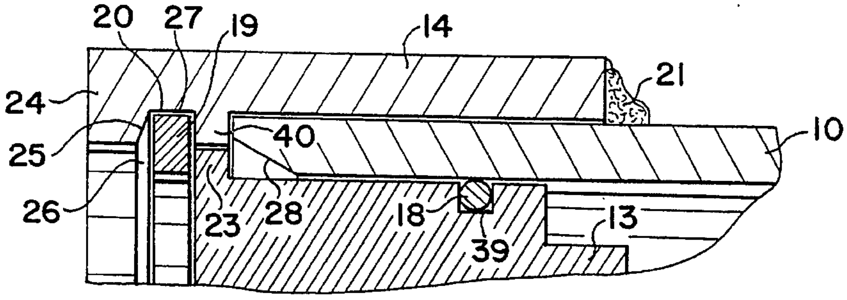
FIG. 4 is an enlarged cross-sectional view of the cylinder barrel, rod gland, and gland retainer in one embodiment of the invention.
Figure 5:
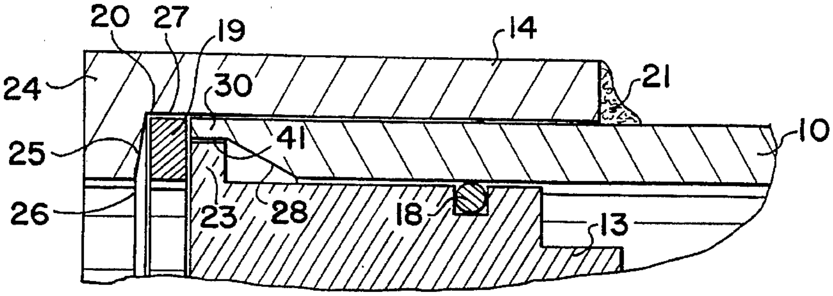
FIG. 5 is an enlarged cross-sectional view of the cylinder barrel, rod gland, and gland retainer in a second embodiment of the invention.

The above components and their general relationship to each other is part of the prior art to this invention. The connections between barrel 10, gland 13, and gland nut 14' comprise the location of the improvements of this invention. In the prior art as seen in FIG. 3, cylinder barrel 10 is provided with outside-threads at 22' along its bottom portion. Similarly, gland nut 14' is provided with interior threads to engage such threads at 22. Gland nut 14' can then be screwed tightly onto cylinder barrel 10. Gland 13 has a bottom circular flange 23' which extends outwardly from the main body of rod gland 13 such that the main body fits snugly into the inside surface or bore 29 of cylinder barrel 10 and flange 23' fits against the bottom of barrel 10. As shown in FIG. 2, bore 29 is uniform throughout the length thereof between closed end 16 and to closely adjacent the opposite open end. Gland nut 14' has an inwardly extending flange or ledge 24' which overlaps flange 23' of gland 13 and compresses flange 23' between the end of barrel 10 and gland nut flange or ledge 24' as nut 14' is tightened onto barrel 10 by means of screw threads 22'. O-ring 18 is seated in a corresponding groove 39 in rod gland 13 to seal against oil leakage between barrel 10 and gland 13. This arrangement in the prior art is not completely desirable for several reasons. Firstly, the threaded connection 22' weakens the walls of barrel 10 and nut 14' by sacrificing the metal lost when the threads are cut into the components. Secondly, threads can become stripped by any of a variety of occurrences, and the resulting connection is either faulty or impossible to achieve. Thirdly, the proper sizing of flanges 23' and 24' and the seat into which flange 23' fits must all be precisely fashioned or the operation of the hydraulic cylinder may be adversely affected. Accordingly, this invention provides the improved connections in the encircled area 31 of FIG. 2, as shown in FIGS. 1, 2, 4, and 5. The arrangement in FIGS. 1 and 2 is shown in an enlarged partial section in FIG. 4 and an alternate embodiment is shown in FIG. 5.

In the first embodiment (FIGS. 1, 2 and 4) cylinder barrel 10 and gland retainer 14 are welded together at 21, thus eliminating the threaded connection 22 of the prior art (see FIG. 3). This preserves the full strength of the walls of barrel 10 and nut 14. The lower end of gland retainer 14 is fashioned with a circular tongue 40 on gland retainer 14 as a partial seat for the end of barrel 10 and a groove 20 for a split ring spring retainer 19 forming a part of the gland retainer assembly. One side of groove 20 is a flange or ledge 24. Flange 23 on gland 13 is smaller than the corresponding flange 23' of the prior art of FIG. 3 and forms a partial seat for the end of barrel 10, cooperating with tongue 40 for this purpose. Groove 20 is configured to form a seat for a split ring spring retainer 19 which abuts against the bottom of gland 13 and holds it in place. In order to facilitate the assembly of gland 13 into the lower interior of cylinder barrel 10 it is preferred to taper the walls of barrel 10 as at 28 on the inside surface of cylinder barrel 10. This permits gland 13 to be centered in barrel 10 and pushed into place while gradually compressing O-ring 18 without fear of dislodging it from groove 39. The amount of taper 28 is preferably about 30°.

It is noted that bore 29 is uniform throughout the length thereof between closed end 16 and closely adjacent taper 28 at the open end.

Another improved feature is to provide retainer receiving groove 20 with a tapered opening to facilitate the insertion or removal of split ring spring retainer 19. The opening 26 of groove 20 is wider in the axial direction than the bottom 27 of groove 20. Preferably the amount of taper 25 is about 1°–5°. In the illustration of FIGS. 2 and 4, ledge 24 is the tapered side 25 of groove 20. Retainer 19 is sufficiently large to extend inwardly beyond the end of tongue 20 so as to bear against the bottom of gland 13.

A second embodiment of these connections between barrel 10, gland 13, and gland retainer 14 is shown in FIG. 5. In this embodiment gland retainer 14 is even made simpler by eliminating tongue 40 (see FIG. 4) and compensating for that elimination by forming tongue 30 on the bottom of cylinder barrel 10 thus forming a rabbet groove 41. This combination provides a seat for flange 41 of gland 13 and a groove 20 for split ring spring retainer 19 by the combination of ledge 24 and the bottom of gland 13 and cylinder barrel 10. This is similar and yet simpler in construction to that of FIG. 4. Here, also, tapered surfaces 25 and 28 respectively facilitate the insertion and removal of retainer 19 from groove 20 and the insertion and removal of gland 13 from cylinder barrel 10.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. In a hydraulic cylinder having a cylindrical barrel with a closed end and an open end, said barrel having an interior bore uniform throughout the length thereof between said closed end and closely adjacent to said open end, a piston slidably disposed within said barrel, a rod gland disposed within and closing said open end of said barrel and having a small central passageway spaced from said barrel and aligned with a longitudinal axis of said barrel, an elongated piston rod spaced from said barrel and slidably disposed in said passageway and having one end attached to said piston and an exposed end external of said barrel, said rod gland carrying sealing means exposed in said small passageway and engaged with said piston rod against leakage for sealing therebetween, said rod gland carrying other sealing means exposed to and engaged with said barrel for scaling against leakage therebetween, said rod gland forming a directly engaged stop for said piston when said piston rod is fully extended, the improvement comprising a rod gland retainer assemble including a gland retainer welded outwardly of and to said barrel in the absence of any screw thread connection therebetween, said gland retainer having an internal circumferential ledge, and said assembly further including a split ring spring retainer removably inserted between said ledge and said rod gland for bearing against said rod gland and solely holding said rod gland in place.

2. The hydraulic cylinder of claim 1 wherein said rod gland fits closely inside one end of said cylinder barrel and sealed thereto with an O-ring seal in a seal groove positioned circumferentially around the outside of said gland, said one end of said cylinder barrel having a tapered portion to provide facility in inserting said rod gland and O-ring seal therein.

3. The hydraulic cylinder of claim 2 wherein said tapered portion has an inside surface which begins from a smaller diameter adjacent said O-ring to a larger diameter at said one end of said cylinder barrel.

4. The hydraulic cylinder of claim 3 wherein said taper is about 1°–30°.

5. The hydraulic cylinder of claim 1 wherein said rod gland includes an outwardly extending flange along its outer extremity fitting into a rabbet groove in an edge of said cylinder barrel and said split ring spring retainer bearing against both said cylinder barrel and said rod gland.

6. In a hydraulic cylinder having a cylinder barrel with a closed end and an open end, said barrel having an interior bore substantially uniform throughout the length thereof between said closed and to closely adjacent said open end, a piston, a piston rod, a rod gland, the improvement, which comprised a rod gland retainer assembly including a gland retainer welded outwardly of and to said cylinder barrel in the absence of any screw thread connection therebetween, said gland retainer having an internal circumferential ledge, and said assembly further including a split ring spring retainer removably inserted between said ledge and said rod gland for bearing against said rod gland and solely holding said rod gland in place, said rod gland including an outwardly extending flange along its outer extremity fitting into a rabbet groove in an inner edge of said cylinder barrel.

7. In a hydraulic cylinder having a cylinder barrel, a piston, a piston rod, a rod gland, the improvement which comprises a rod gland retainer assembly including a gland retainer welded outwardly of and to said cylinder barrel in the absence of any screw thread connection therebetween, said gland retainer having an internal circumferential ledge, and said assembly further including a split ring spring retainer removably inserted between said ledge and said rod gland so as to bear against said rod gland to hold it in place, said gland retainer including an inwardly extending circumferential tongue which forms a seat for said cylinder barrel and also forms in combination with said ledge a groove for seating said split ring spring retainer.

8. In a hydraulic cylinder having a cylindrical barrel with a closed end and an open, a piston slidably disposed within said barrel, a rod gland disposed within and closing said open end of said barrel and having a small central passageway spaced from said barrel and aligned with a longitudinal axis of said barrel, an elongated piston rod spaced from said barrel and slidably disposed in said passageway and having one end attached to said piston and an exposed end external of said barrel, said rod gland carrying sealing means exposed in said small passageway and engaged with said piston rod against leakage for sealing therebetween, said rod gland forming a stop for said piston when said piston rod is fully extended, the improvement comprising a rod gland retainer assembly including a gland retainer welded outwardly of and to said barrel in the absence of any screw thread connection therebetween, said gland retainer having an internal circumferential ledge, and said assembly further including a split ring spring retainer removably inserted between said ledge and said rod gland for bearing against said rod gland and solely holding said rod gland in place, said ledge being tapered adjacent said split ring to provide facility in inserting and removing said split ring spring retainer.

9. The hydraulic cylinder of claim 8 wherein said ledge is formed by a groove with an open portion facing said piston rod and a bottom farther away from said rod than said opening, the taper of said groove being such that said opening is wider than said bottom when measured lengthwise of said cylinder barrel.

10. The hydraulic cylinder of claim 9 wherein said taper is about 1°–5°.

11. In a hydraulic cylinder having a cylindrical barrel with a closed end and an open end, a piston slidably disposed within said barrel, a rod gland disposed within and closing said open end of said barrel and having a small central passageway spaced from said barrel and aligned with a longitudinal axis of said barrel, an elongated piston rod spaced from said barrel and slidably disposed in said passageway and having one end attached to said piston and an exposed end external of said barrel, said rod gland carrying other sealing means exposed to and engaged with said barrel for sealing against leakage therebetween, said rod gland forming a stop for said piston when said piston rod is fully extended, the improvement comprising a rod gland retainer assembly including a gland retainer welded outwardly of and to said barrel in the absence of any screw thread connection therebetween, said gland retainer having an internal circumferential ledge, and said assembly further including a split ring spring retainer removably inserted between said ledge and said rod gland for bearing against said rod gland and solely holding said rod gland in place, said gland retainer including an inwardly extending circumferential tongue which forms a seat for said cylinder barrel and also forms in combination with said ledge a groove for seating said split ring spring retainer.

* * * * *